United States Patent
Leshchiner et al.

(10) Patent No.: US 9,418,130 B2
(45) Date of Patent: Aug. 16, 2016

(54) DATA REPLICATION PROTOCOL WITH EFFICIENT UPDATE OF REPLICA MACHINES

(71) Applicant: TIBCO Software Inc., Palo Alto, CA (US)

(72) Inventors: Dan Leshchiner, Sunnyvale, CA (US); Matthias M. Hanel, Mountain View, CA (US)

(73) Assignee: TIBCO Software, Inc., Palo Alto, CA (US)

( * ) Notice: Subject to any disclaimer, the term of this patent is extended or adjusted under 35 U.S.C. 154(b) by 231 days.

(21) Appl. No.: 13/842,389

(22) Filed: Mar. 15, 2013

(65) Prior Publication Data

US 2014/0143205 A1 May 22, 2014

Related U.S. Application Data

(60) Provisional application No. 61/723,316, filed on Nov. 6, 2012.

(51) Int. Cl.
*G06F 17/30* (2006.01)

(52) U.S. Cl.
CPC ................ *G06F 17/30575* (2013.01)

(58) Field of Classification Search
CPC ............ G06F 17/30327; G06F 17/30575
USPC ........................................................ 707/626
See application file for complete search history.

(56) References Cited

U.S. PATENT DOCUMENTS

| 6,751,634 | B1* | 6/2004 | Judd ............... G06F 17/30371 |
| 7,698,319 | B2* | 4/2010 | Taniguchi .......... G06F 11/1471 707/674 |
| 8,909,677 | B1* | 12/2014 | Aguilera et al. ............. 707/797 |
| 2005/0076006 | A1* | 4/2005 | D'Angelo .......... G06F 17/30368 |
| 2006/0010107 | A1 | 1/2006 | Nguyen |
| 2006/0288056 | A1 | 12/2006 | Yamakawa |
| 2008/0301663 | A1 | 12/2008 | Bahat et al. |
| 2009/0112932 | A1* | 4/2009 | Skierkowski .......... G06Q 10/06 |
| 2010/0333116 | A1 | 12/2010 | Prahland |
| 2011/0060722 | A1 | 3/2011 | Li |
| 2011/0258178 | A1 | 10/2011 | Eidson |
| 2012/0042196 | A1* | 2/2012 | Aron .................. G06F 11/2028 714/4.11 |
| 2012/0246179 | A1* | 9/2012 | Garza ............... G06F 17/30297 707/752 |

OTHER PUBLICATIONS

International search report and written opinion of the international searching authority from co-pending PCT application No. PCT/US13/68808 mailed May 21, 2014.

International search report and written opinion of international searching authority in PCT/US2013/068805 mailed May 14, 2014.

* cited by examiner

*Primary Examiner* — Huawen Peng

(74) *Attorney, Agent, or Firm* — Baker & McKenzie LLP

(57) ABSTRACT

Steady state data distribution is provided between a client application, a leader machine, and a plurality of replica machines. The distribution comprises the leader machine receiving an operation request from the client application, the leader machine sending the prepare message to each of the plurality of replica machines, the replica machines recording in their logs information on the operation, the replica machines sending acknowledgement messages to the leader machine, and the leader machine sending commit command messages to the replica machines. A new quorum of the replica machines is created by using log information. Replica machines that become part of the new quorum are updated in an efficient manner.

31 Claims, 27 Drawing Sheets

| Key | Data |
|-----|------|
| 1 | ... |
| 2 | ... |
| 3 | ... |
| 4 | ... |

FIGURE 5(A)

| Key | Data |
|-----|------|
| 1 | ... |
| 3 | ... |
| 4 | ... |
| 5 | ... |

FIGURE 5(B)

| Version | 1 | 2 | 3 | 4 | 5 |
|---|---|---|---|---|---|
| Operation | ~~Insert~~ | ~~Insert~~ | Update | Insert | Delete |
| Key | ~~1~~ | ~~2~~ | 1 | 3 | 2 |
| Value | ~~100~~ | ~~20~~ | 14 | 85 | — |

FIGURE 7

| | |
|---|---|
| Version | 1 |
| Operation | Insert |
| Key | 1 |
| Value | 100 |

FIGURE 8(A)

| Version | 1 | 2 |
|---|---|---|
| Operation | Insert | Insert |
| Key | 1 | 2 |
| Value | 100 | 20 |

FIGURE 8(B)

| Version | 1 | 2 | 3 |
|---|---|---|---|
| Operation | Insert | Insert | Insert |
| Key | 1 | 2 | 3 |
| Value | 100 | 20 | 50 |

FIGURE 8(C)

| Version | 1 | 3 | 4 |
|---|---|---|---|
| Operation | Insert | Insert | Update |
| Key | 1 | 3 | 2 |
| Value | 100 | 50 | 75 |

FIGURE 8(D)

| Version | 1 | 3 | 4 | 5 |
|---|---|---|---|---|
| Operation | Insert | Insert | Update | Insert |
| Key | 1 | 3 | 2 | 4 |
| Value | 100 | 50 | 75 | 90 |

FIGURE 8(E)

| Version | 1 | 3 | 5 | 6 |
|---|---|---|---|---|
| Operation | Insert | Insert | Insert | Delete |
| Key | 1 | 3 | 4 | 2 |
| Value | 100 | 50 | 90 | — |

FIGURE 8(F)

| Version | 1 | 3 | 5 | 6 | 7 |
|---|---|---|---|---|---|
| Operation | Insert | Insert | Insert | Delete | Insert |
| Key | 1 | 3 | 4 | 2 | 5 |
| Value | 100 | 50 | 90 | — | 66 |

FIGURE 8(G)

| Version | 3 | 5 | 7 | 8 |
|---|---|---|---|---|
| Operation | Insert | Insert | Insert | Delete |
| Key | 3 | 4 | 5 | 1-2 |
| Value | 50 | 90 | 66 | — |

FIGURE 8(H)

| Version | 3 | 7 | 8 | 9 |
|---|---|---|---|---|
| Operation | Insert | Insert | Delete | Delete |
| Key | 3 | 5 | 1-2 | 4 |
| Value | 50 | 66 | — | — |

FIGURE 8(I)

| Version | 7 | 10 |
|---|---|---|
| Operation | Insert | Delete |
| Key | 5 | 1-4 |
| Value | 66 | — |

FIGURE 8(J)

| Version | T6 | T7 | T9 |
|---|---|---|---|
| Operation | Delete | Insert | Delete |
| Key | 5 | 6 | 7 |
| Value | — | 89 | — |

FIGURE 11(A)

DATA REPLICATION PROTOCOL WITH EFFICIENT UPDATE OF REPLICA MACHINES

CROSS-REFERENCE TO RELATED APPLICATION

This application claims priority to U.S. Provisional Patent Application No. 61/723,316, filed on Nov. 6, 2012, entitled "Data Replication Protocol with Steady State Data Distribution, Quorum Formation, and Efficient Update of Replica Machines." This application is also related to concurrently filed and commonly assigned patent application Ser. No. 13/842,443, filed on Mar. 15, 2013, entitled "Data Replication Protocol with Steady State Data Distribution and Quorum Formation," both of which are incorporated herein for all purposes.

TECHNICAL FIELD

The present disclosure relates generally to systems and methods for replicating data, providing steady state data distribution, forming new quorums, and efficiently updating replica machines.

BACKGROUND

Servers and networks often experience failures, resulting in data loss. An ability to store the same data in multiple places has thus become an important aspect of data management. This requires steady state data distribution and effective data replication.

SUMMARY

Disclosed herein are various embodiments of a high throughput data replication protocol, capable of providing steady state data distribution and quorum formation, and an enhanced method for efficiently updating data structures. In an embodiment, the steady state data distribution protocol may allow multiple outstanding prepare operations, and the quorum formation may be a three-phase commit quorum formation protocol tolerant to multiple outstanding prepare operations that minimizes a number of necessary quorum elections and reduces data copying in failure situations. In an embodiment, the sort and search data structures are enhanced B+ trees that allow efficient updates of replica machines in a data replication system. In another embodiment, efficiently bounded operation logs may be employed for efficient updating of replica machines. The updates can be handled while the data structures continue processing additional insert, update, or delete operations. In another embodiment, a V Tree keeps a hierarchical summary of both its operational history and of deleted keys, which enables fast identification of sub-trees that require synchronization.

BRIEF DESCRIPTION OF THE DRAWINGS

For a more complete understanding of the present disclosure and its advantages, reference is now made to the following description taken in conjunction with the accompanying drawings, in which like reference numbers indicate like features.

FIGS. 5(A)-5(B) are diagrams illustrating updating a replica machine's database table;

FIG. 7 is a diagram of an example of a replica machine's log after certain operations;

FIGS. 8(A)-8(J) are diagrams illustrating a process of updating a replica machine's log according to instructed operations;

FIGS. 11(A)-11(B) are diagrams illustrating changes in a replica machine's log during the catch-up protocol;

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Figure 1:
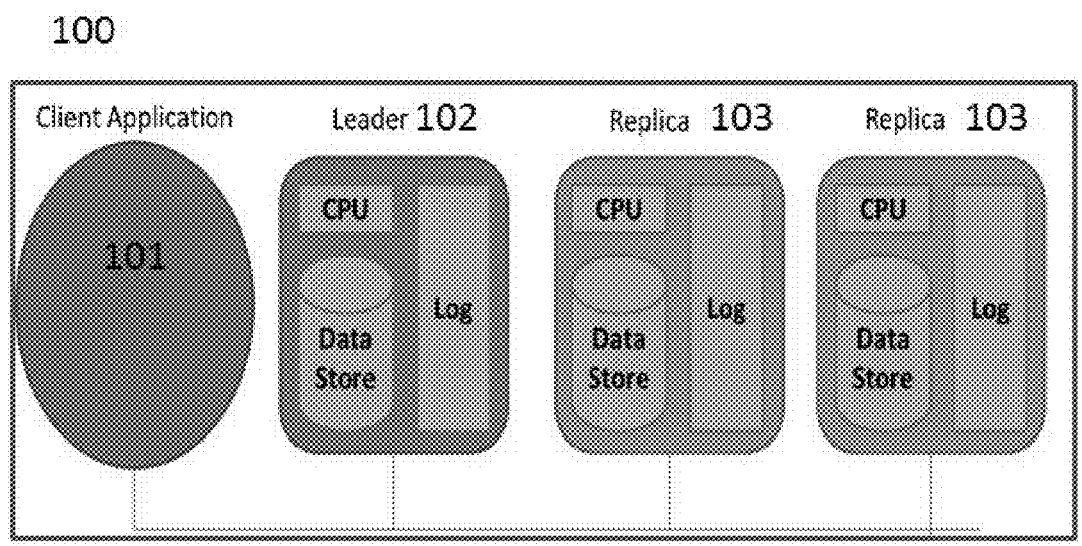
FIG. 1 is a schematic diagram illustrating an example of a system comprising a client application, a leader machine, and replica machines.

Building a system for data replication is often important for being able to store the same data in multiple places so that it can be retrieved from multiple places if there is a network, server, or system failure. In an embodiment, the multiple places are replica machines. Effective data replication often requires or is related to steady state data distribution, which further relates to formation of quorums of the replica machines and efficient updating of the replica machines. Thus, embodiments of the data replication, quorum formations, and efficient updating of the replica machines as provided in this disclosure can work in an interrelated manner. The efficient updating of the replica machines as disclosed, in particular, can be performed while carrying out the data replication as provided in this disclosure. This disclosure provides various embodiments for achieving these goals.

1. Data Replication
1.1. Overview of Data Replication FIG. 1 illustrates an embodiment of a system, wherein a client application 101 communicates with a leader machine 102 and replica machines 103. The leader machine 102 and the replica machines 103 may be peer machines, which may further comprise a CPU, a data store, and a log. In other embodiments, the leader machine 102 and replica machines 103 may contain other necessary components. The machines may be desktop PCs, laptop PCs, tablets, Smartphones, or any other suitable devices. In an embodiment, the client application sends instructions to the leader machine 102. The leader machine 102 is selected from the replica machines 103 to perform its role. More details are provided in section 1.2 entitled, "Leader Election."

In an embodiment, the client application 101 may send a request for an operation to the leader machine 102, which, in turn, distributes the request to the replica machines 103 (collectively called a quorum) and manages the overall group's state of completion. In an embodiment, the operation may be an insert, update, or delete.

Figure 2:
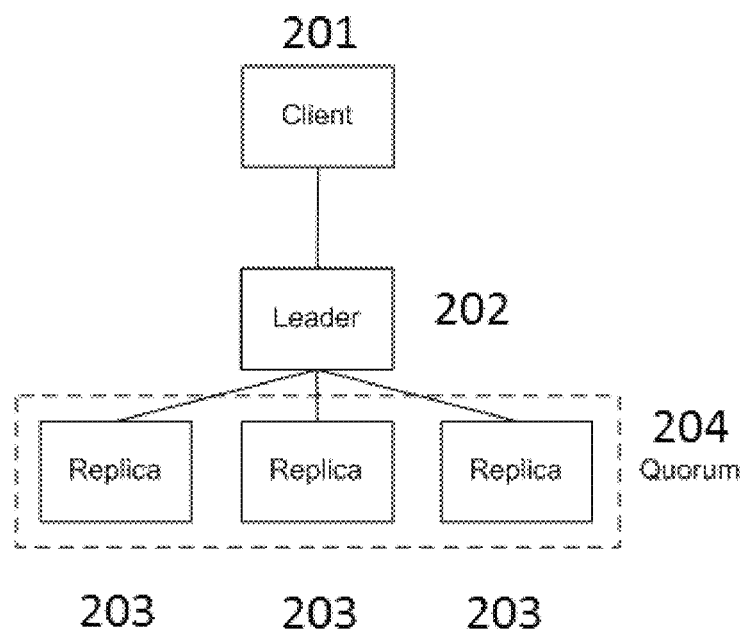
FIG. 2 is another schematic diagram illustrating the example system comprising the client application, the leader machine, and replica machines.

FIG. 2 is another diagram illustrating a configuration wherein a transfer of an operation request from a client application 201 is made to a leader machine 202, which further distributes the operation request to replica machines 203 and tracks its completion. A collection of the replica machines is called a quorum 204. The client application 101 may be any suitable machine, software, or application employed by a client. In an embodiment, the client application 101 sends an operation and data to the leader machine 102. The operation may be an insert, update, or delete. The leader machine 102 sends the operation and the data to the replica machines 103 and requests the replica machines 103 to prepare. The replica machines 103 record or log the operation and the data in their logs, and send acknowledgments to the leader machine 202, without executing the operation. The log may be any suitable data structure. When the leader machine 102 receives acknowledgements from a majority of the replica machines 103, the leader machines 102 determines that the request has been completed, and, sends an acknowledgment to the client application 101 and sends a commit command to the replica machines 103. In an embodiment, the acknowledgments are sent to the client application 101 if the client application 101 has requested it. Upon receiving the commit command, the replica machines 103 execute the requested operation.

Such a protocol, as further provided below, allow the system to survive process outages, message losses, or network breaks, and recover to an externally consistent state.

1.2. Leader Election

Any suitable election protocol can be used to elect a leader machine. In an embodiment, the protocol is based on an open shortest path first (OSPF) designated router election protocol.

1.3. Steady-State Data Distribution Protocol

An embodiment of a steady-state data distribution protocol may include request, prepare, acknowledgement, and commit messages passed between the client application 101, the leader machine 102, and the Replica machines 103. In an embodiment, the steady-state data distribution protocol is also referred to as steady-state data replication protocol. In this embodiment, the protocol may be implemented, as a basis for the communication, by labeling the operation as O, and the data as D. The quorums 204 may be assigned a monotonically increasing quorum ID number, labeled as Q. The operation requests may be assigned a monotonically increasing version ID number, labeled as V. In another embodiment, the version ID number may alternatively be called an operation version number.

Figure 3:
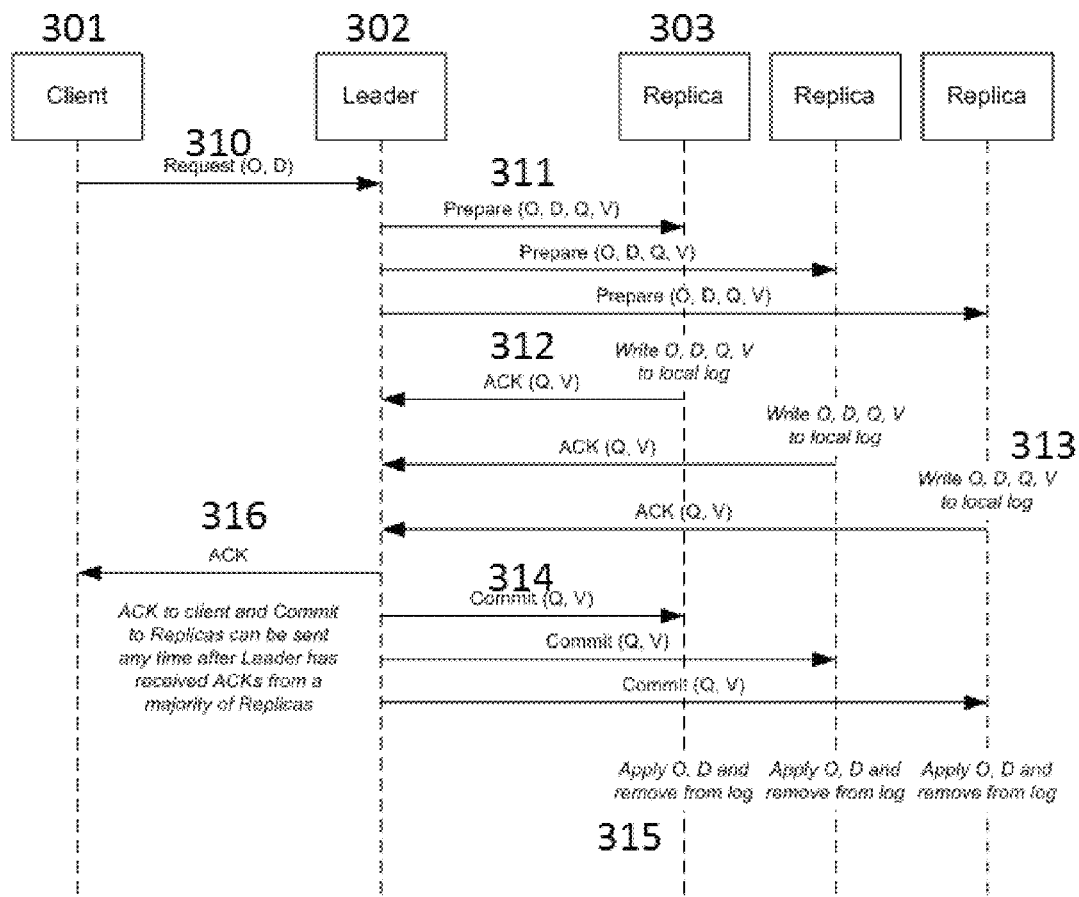
FIG. 3 is a diagram illustrating an operation of a steady-state data distribution process involving a client application, a leader machine, and replica machines.

FIG. 3 illustrates an embodiment of an operation of the steady-state protocol. Actions by leader machines 302 (i.e., sending an acknowledgment message or ACK 316 to a client application 301 and sending a commit message 314 to replica machines 303) may occur substantially immediately upon receipt of a majority of acknowledgment messages or ACKs 312 from the replica machines 303. In an embodiment, the acknowledgment messages 316 sent by the leader machines 302 to the client application 301 are referred to as second acknowledgment messages and the acknowledgment messages 312 sent by the replica machines 303 to the leader machine 302 are referred to as first acknowledgment messages. In another embodiment, the names may be reversed. The prepare message 311, ACK messages 312, 316, and commit message 314 may interleave differently than shown in FIG. 3. In an embodiment, the prepare message 311 may be called prepare, acknowledgment message may be called ACK, and commit message may be called commit for sake of simplicity. The application of the operation (illustrated as "O" in the figure) and the removal of the operation from the log is atomically accomplished. The leader machine 302 remembers the version ID number V of the operation in the last prepare message 311. If the leader machine 302 receives an additional client application request 310 before committing operation V, it may assign a version ID number V+1 to the new operation and substantially immediately send a matching prepare request. Thus, several consecutive prepare messages may be outstanding substantially simultaneously (waiting for ACK). In an embodiment, the prepare messages 311 and commit messages 314 are both ordered at the leader machine 302 and at all the replica machines 303 (e.g., V is committed before committing V+1).

1.4. Quorum Formation

In an embodiment, if the operational status of one or more of the replica machines 303 or the channels that connect the replica machines 303 change, the system recovers to a consistent state. This process may involve, for example, gathering log histories from the replica machines 303 currently in operation, identifying the most recent ("best") log history from the replica machines 303 gathered, identifying a new quorum of the replica machines 303, updating the replica machines 303 in the quorum with the selected best log history, and resuming processing according to the steady-state protocol.

Figure 4:
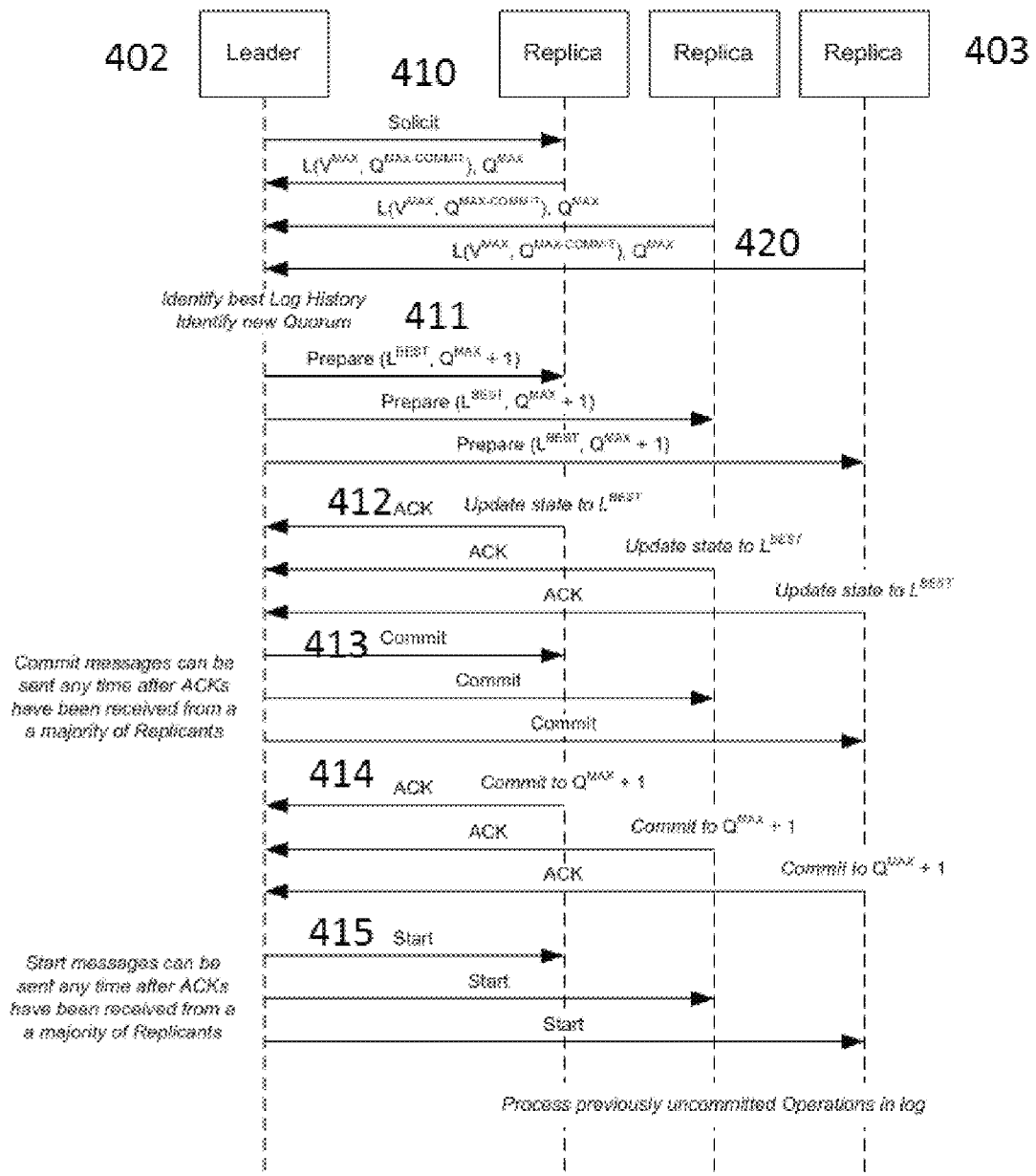
FIG. 4 is a diagram illustrating a quorum formation process involving a leader machine and replica machines.

FIG. 4 illustrates an embodiment of a quorum formation process. In the embodiment, the quorum formation is handled by a three-phase commit protocol that transitions the system from the failed quorum to a new quorum. The three phases are solicit 410, prepare 411, and commit 413. The embodiment may also allow for members of the new quorum to at least initially be in sync.

Upon completion of the commit phase 413, a start command 415 is issued by the leader machine 402 to the replica machines 403, indicating that the replica machines 403 return to the steady-state protocol and process the remaining uncommitted operations in their logs. However, execution of this protocol should be guarded against interference between multiple simultaneous leader machines that may exist because of temporary inconsistencies in the Leader Election protocol of section 1.2 above. In an embodiment, Stake Replication technique is used as described in "Replication Techniques for Availability" by van Renesse and Guerraoui in *Replication, Theory and Practice* edited by Bernadette Charron-Bost, et al. However, in other embodiments, other replica consensus establishment techniques may be used.

For simplicity, a replica machine 403's log history may be labeled L and include two elements, the largest operation version in the replica machine's log is labeled $V^{MAX}$, wherein the $V^{MAX}$ may represent either a committed or an uncommitted operation, and the largest quorum ID to which the replica machine 403 has committed via an ACK 414 to a commit request 413 is labeled $Q^{MAX\text{-}COMMIT}$.

In an embodiment, the replica machine 403's log history selected as "best" (as further described in section 1.4.1 entitled Identifying Best Log History) is labeled $L^{BEST}$. In an embodiment, the best log history may refer to the most recent log history. The largest ID for a quorum, which a replica machine 403 has been asked to be a part of (whether it is committed or not), is labeled $Q^{MAX}$. The leader machine 402 may have a priori knowledge of the replica machines 403 to which it sends the solicit messages 410. For example, the complete set of replica machines 403 may be known by configuration. Message order may be preserved by the system and message loss may be known. Transmission Control Protocol (TCP)-like semantics on the communication channel between the leader machine 402 and the replica machines 403 may be assumed.

FIG. 4 is a schematic diagram illustrating an embodiment of the operation of the quorum formation protocol. Subsequent sections provide details on operations within the protocol flow.

1.4.1. Identifying Best Log History

In an embodiment, the leader machine 402 may receive replies 420 after it sends initial solicitations 410 to the replica machines 403. The replies 420 may include the log history, shown as "L," which includes the largest operation version labeled $V^{MAX}$ in the replica machine 403's log history and the largest quorum ID labeled $Q^{MAX\text{-}COMMIT}$ to which the replica machine 403 has committed (via ACK to a commit request) as part of the quorum formation protocol. The replies 420 may further include the largest quorum ID labeled $Q^{MAX}$ that a replica machine 403 has been asked to be a part of (whether or not it has committed).

In the present embodiment, the leader machine 402 may identify the best log history, $L^{BEST}$, as the log history with the largest $Q^{MAX\text{-}COMMIT}$. In an embodiment, if two or more responding replica machines 403 have the same $Q^{MAX\text{-}COMMIT}$, the log history of the replica machine 403 with the largest $V^{MAX}$ is selected.

The point at which the leader machine calculates the $L^{BEST}$ can be triggered in a variety of ways, including (a) the receipt of responses from a majority of the replica machines, or (b) a timer.

1.4.2. Identifying New Quorum

In an embodiment, once the best log history is identified, the leader machine 402 may identify a majority of replica machines 403 that share that log history (ones that return the same log history in their response to the initial solicit) or that can be updated to have that log history. This may have to be a majority of all replica machines 403, rather than a majority of the replica machines 403 that responses 420 were received from. In another embodiment, the responses 420 may alternatively be called reply messages. The responses 420 from the replica machines 403 may be categorized into four categories:

A. A log history that is $L^{BEST}$.
  B. A log history that is not as recent as $L^{BEST}$, and is labeled as $L^{NOT\text{-}BEST}$. This is indicated by $Q^{MAX\text{-}COMMIT}$ (or $V^{MAX}$) being less than that in $L^{BEST}$.
  C. No log history, which is labeled as $L^0$, and is indicated by $V^{MAX}=0$ and $Q^{MAX\text{-}COMMIT}=0$.
  D. No response.

Category (C) occurs when a replica machine 403 fails and loses its log history in memory. In an embodiment, $L^0$ is not considered for $L^{BEST}$ or $L^{NOT\text{-}BEST}$. Thus, a new quorum may not be formed if there is one or more non-respondent replica machines 403 and the combined number of replica machines 403 in categories (C) and (D) is a majority. This is because as a majority, replica machines 403 in categories (C) and (D) may have already formed a new quorum that has committed operations that are more recent than the ones in $L^{BEST}$. And the presence of at least one replica machine 403 in category (D) indicates that $L^{BEST}$ may yet be recoverable (i.e. through administrative means).

In an embodiment, there are three cases in which a new quorum may be formed:
1. Category (A) is a majority.
2. Category (A) is a minority, but categories (A) and (B) together form a majority.
3. Category (D) is empty, where one of the following situations may be true:
  a. Categories (A), (B) and (C) include all the replica machines.
  b. Categories (A) and (C) include all the replica machines.
  c. Category (C) includes all the replica machines.

In an embodiment, the point at which the leader machine 402 determines whether or not a quorum can be formed may be triggered in various ways, including (a) a receipt of the responses 420 from all replica machines 403, or (b) a use of a timer. In an embodiment, a subcase of (3) in which categories (B) and (C) include all the replica machines 403 is not possible. This is because one of the log histories sent by a replica machine in category (B) would be $L^{BEST}$. If the responses 420 match one of the cases above, then a new quorum may be formed from the associated replica machines 403 in categories (A), (B) and (C). If the responses 420 do not match one of the cases above, then a manual intervention (by an administrator) may be used to form a new quorum.

In case (1) of the present embodiment, the new quorum may consist of the replica machines 403 in category (A). In case (2), the new quorum may consist of the replica machines 403 in categories (A) and (B). In case (3), the new quorum may consist of the replica machines 403 in categories (A), (B) and (C). In cases (2) and (3), the replica machines 403 being introduced into the quorum from categories (B) and (C) have to substantially be updated so that their log histories are the same as $L^{BEST}$. An efficient protocol for making this update is further described in section 1.4.3 entitled Update State to $L^{BEST}$.

In an embodiment, the minimum requirement for a quorum may be a majority of all the replica machines 403; in case (1) a quorum may be formed with only the replica machines from (A) to create a majority. Similarly, in case (2), only a minimum number of the replica machines in (B) may be updated to form a majority with the replica machines in (A). Similarly, in case (3), only a minimum number of the replica machines in (B) and (C) may be updated to form a majority with the replica machines in (A). In an embodiment, the number of updated replica machines 403 balances the cost of the update (i.e., which may be performed in parallel for efficiency) against the value of having additional replica machines 403 on-line.

1.4.3. Update State to $L^{BEST}$

In an embodiment, a replica machine 403 may be efficiently updated from its current state to a state represented by $L^{BEST}$. The update allows for the replica machine 403 being updated to synchronize two elements of the best log history, which are uncommitted operations and committed data values. Efficiently synchronizing uncommitted operations may be simple because the difference between $L^{NOT-BEST}$ and $L^{BEST}$ may be quickly and easily identified. The simplicity is provided by the order in which the operations are prepared. If $L^{NOT-BEST}$ and $L^{BEST}$ contain uncommitted operations from different quorums, the replica machine 403 with $L^{NOT-BEST}$ discards those operations and copies the list of uncommitted operations from $L^{BEST}$. If $L^{NOT-BEST}$ and $L^{BEST}$ contain uncommitted operations from the same quorum, synchronizing $L^{NOT-BEST}$ with $L^{BEST}$ involves discarding stale operations at the head of $L^{NOT-BEST}$ (operations that are known to have been committed by virtue of their absence in $L^{BEST}$) and copying missing operations from the tail of $L^{BEST}$. Given that the operations are numbered with sequential, monotonically increasing IDs, the appropriate head and tail may be identified.

In the present embodiment, efficiently synchronizing committed data values may be complex, because the difference between $L^{NOT-BEST}$ and $L^{BEST}$ may not always be quickly and easily identified. The complexity may be due to the non-linear order in which data elements may be modified by update and delete operations. Data tagged with keys 1, 2, 3, 4 and 5 may be inserted in that order, where data tagged with keys 5 and 2 are modified. Unlike the operation log, which includes contiguous regions (head, overlap, tail), the data table can be speckled with updated data.

1.4.4. Commit to $Q^{MAX}+1$

In an embodiment, as part of the quorum formation protocol, a leader machine 402 may send commit requests 413 to replica machines 403. Upon receipt of the commit message 413, each replica machine 403 may be assured that a majority of the replica machines 403 have sent an ACK 412 in response to the prepare request 411. The replica machines 403 may respond to the commit request 413 by committing to the new quorum, which is indicated by committing $Q^{MAX}+1$ as their new quorum ID. If the replica machines 403 become involved in another quorum formation protocol, this new ID may be identified as $Q^{MAX-COMMIT}$, the maximum quorum ID to which the replica machines 403 have committed.

1.4.5. Updating Out of Quorum Replica Machines During Steady State

As mentioned in section 1.4.2 Identifying New Quorum, the replica machines 403 lacking $L^{BEST}$ may be left out of a newly formed quorum if that quorum can start without it. In an embodiment, these replica machines 403 may get updated once the quorum enters a steady state. The update mechanism may allow history update to be applied in parallel to receiving and applying steady state operations of the ongoing quorum.

2. Efficient Update of a Replica Machine

As described in section 1.4 Quorum Formation, a quorum formation may involve updating replica machines 403 with older log histories to a state that matches the best log history at that moment. This section describes an embodiment of an algorithm that efficiently performs this update while performing or allowing for additional replicated operations at the same time. In an embodiment, a substantially the same protocol may be used for introducing new replica machines 403 into an existing and operating quorum where a new member replica machine is synchronized with the quorum's state without temporarily halting the quorum's receipt and processing of operations.

Figure 5A:
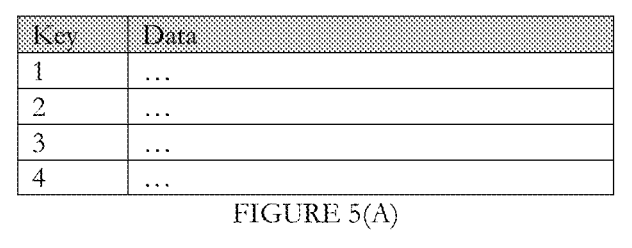

In the present embodiment, committed data may be kept in an external, indexed structure, such as a database table in FIG. 5(A) in which each row is numbered with sequential, monotonically-increasing keys. In this embodiment, the keys are 1, 2, 3, 4.

In the present embodiment, several rules may apply in the operation of the indexed data structure. Insert operations may virtually always create a new entry with the next sequential key. Delete operations may substantially permanently remove the relevant key. Operations may not use the values stored in the preceding operations (i.e., "update" may be a replace operation that is independent of the value being updated). Thus, in the example above, the deletion of the data attached to key 2, and the insertion of a new data item may result in the updated data structure in FIG. 5(B).

Figure 5B:
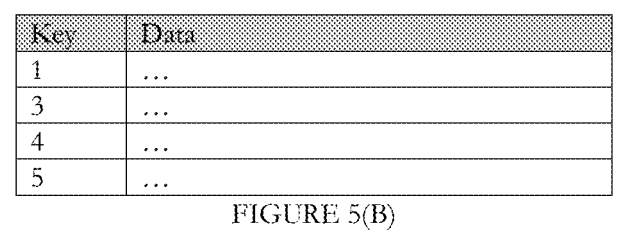

As shown in FIG. 5(B), key 2 has been deleted and is not reused, and key 5 has been created for the newly inserted data. In an embodiment, deleted keys are not reused. In updating a replica machine 403, the replica machine 403's log history is updated to mirror that of $L^{BEST}$. The entire data store may be copied from $L^{BEST}$, but the size of the data would make this process inefficient. An embodiment quickly identifies and copies only the data elements of $L^{BEST}$ that have newer states than that stored in the data store of $L^{NOT-BEST}$. These are identified as the data elements to which one or more operations have been applied in $L^{BEST}$ but not to $L^{NOT-BEST}$.

In an embodiment, each replica machine 403 maintains a data structure that combines the keys and the operations that last touched the replica machine 403 in order to identify the data elements in $L^{BEST}$ to which newer operations have been applied. In an embodiment, a B+ tree is used, but other embodiments may employ any suitable hierarchical structure that provides a higher level (e.g., a tree parent) for summarizing lower levels (e.g., tree children).

2.1. The "V Tree"

2.1.1. Basic V Tree Construction

Figure 6A:
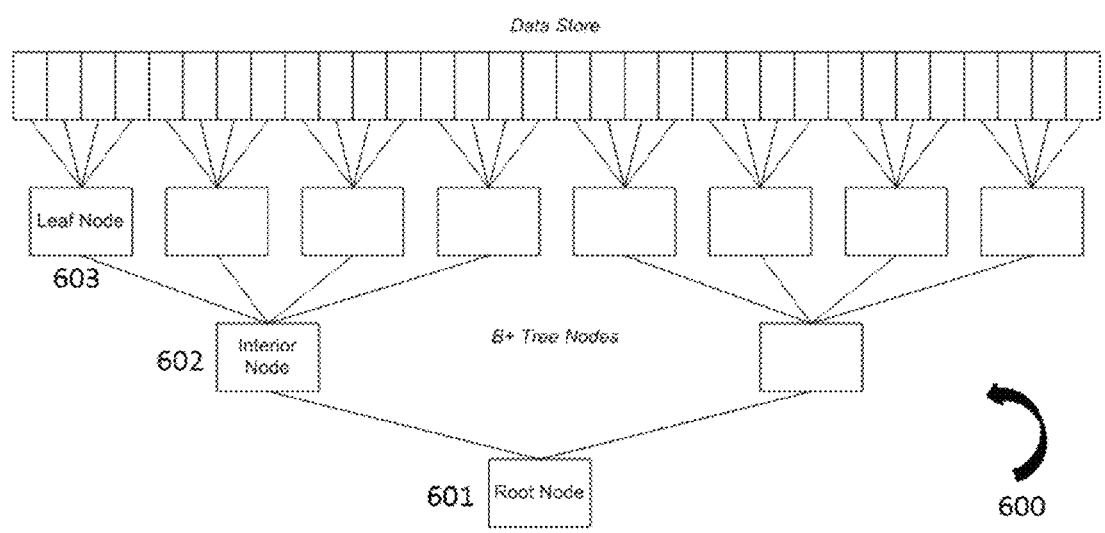
FIG. 6(A) is a diagram of an example B+ tree.

FIG. 6(A) is a schematic diagram illustrating an embodiment of a B+ tree 600. The B+ tree 600 may be constructed upon data store keys, and tree nodes may be further annotated with operation versions. Each replica machine 403 may construct and maintain an n-ary B+ tree 600, built upon the data store keys.

In an embodiment, the tree may be built according to standard properties of a B+ tree 600, which may include, all live keys (those that have not been deleted) that are stored in leaf nodes; each leaf node 603 may contain a number of key values between n/2 and n; each interior node 602 may contain a number of children between n/2 and n; and a root node 601 may have any number of children between 0 and n. Here, n is an operating parameter of the system that has been configured by an administrator to balance space and computation in relation to the system's expected (or observed) pattern of operation. The value n may be different for the tree of the replica machines. The entries in the data store may include a key (K), an operation version ID (V), and data (D), where V is the ID of the last operation to touch D. Storage of D in the present embodiment is accessible by key.

Figure 6B:
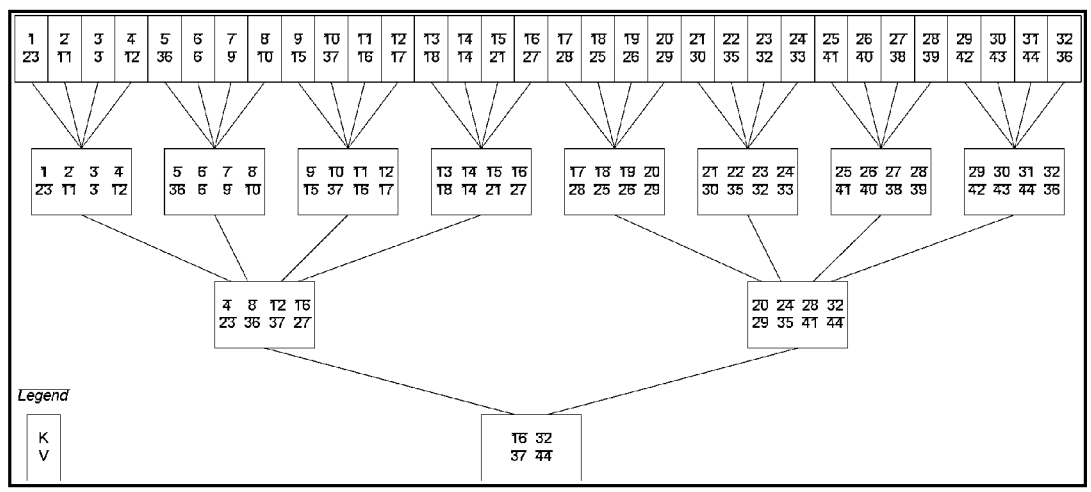
FIG. 6(B) is a diagram of an example B+ tree after certain operations.

In an embodiment, each leaf node 603 contains between n/2 and n (K, V) pairs. Each non-leaf node contains between n/2 and n pairs ($K^{LARGEST}$, $V^{LARGEST}$), where each pair represents the maximum K and V of a child node, and associates each pair with a pointer to the child from which the values were derived. Therefore, the largest key (K) and largest operation version (V) may be inherited from different tuples within a child node. The tree 600 may be built and managed dynamically as each operation is processed. Therefore, after a sequence of insert and update operations (delete operations will be covered subsequently), the tree may look like FIG. 6(B), which omits data D which may not be significant to the discussion pertaining to tree creation or management.

In an embodiment, each (K, V) pair in the tree node may represent a sequence of consecutive keys that ranges from the key that is immediately to the left of the (K, V) pair through to K. In the present embodiment of the above tree, (8, 36) (in the left child of the root) represents Keys 5 through 8, and (32, 44) (in the root) represents Keys 17 through 32. These ranges may be derived from the (K, V) pair to the left ((4, 23) in the first example and (16, 37) in the second example), whether or not that pair is in the same tree node or in a sibling node. Pointers may be kept from each tree node to its siblings. A NULL pointer from a node on the tree's left edge may signal that the bottom end of the range is 1, and MAX_INT may be seeded as K in the rightmost (K, V) pair in each node on the tree's right edge. The initial V tree may consist of a single root node with the (K, V) tuple (MAX_INT, 0). In each case, the (K, V) pair indicates the highest operation version that has been applied to any key that is in the range. For example, (32, 44), which represents the keys 17 through 32, may indicate that the highest operation version that has been applied to any key in that range of keys is version 44.

In an embodiment, the non-leaf nodes summarize the key ranges and operation versions of their children. This may be used to evaluate whether two trees or portions of two trees are identical. This property may be further used for determining whether a sequential range of keys (x, x+1, ..., y) is substantially identical for two replica machines. A sequence of operations, $(V_1, V_2, V_3, \ldots)$ applies to the keys in the sequence. Thus, to determine whether a sequential range of keys is substantially identical between two replica machines, the following observation may be made. If both replica machines report that the largest operation version applied to the sequence of keys are the same, then the entire sequence of operations are considered the same. Therefore, the data associated with the keys may be considered the same.

In an embodiment, if the replica machines report different values for the largest operation version that has been applied to the sequence of keys, then it may be considered that one of the replica machines has applied later operation versions than the other replica machine and that the associated data has been changed. This is important for efficiently updating a replica machine that has missed only a small number of operations because the specific out-of-date keys can be quickly identified, which avoids a detailed comparison of the majority of keys.

2.1.2. Representing Deleted Keys in a V Tree

Figure 6C:
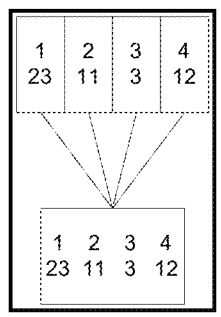
FIGS. 6(C)-6(F) are diagrams illustrating updating of an example tree.
Figure 6D:
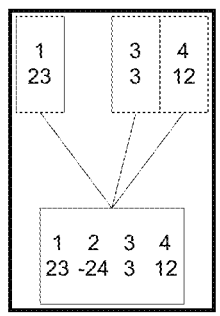

In an embodiment, standard indexed structures such as B+ trees may discard deleted keys and would have no entry that retains the knowledge regarding the operation version of the deleted keys. A V tree may add to the standard indexing of a B+ tree by annotating an operation version in a (K, V) pair that represents a deleted key. FIG. 6(C) illustrates an example of a simple tree that represents four keys. An embodiment may annotate by negating the V value. Thus, for example if a next operation (#24) deletes Key 2, the result would be as shown in FIG. 6(D).

Figure 6E:
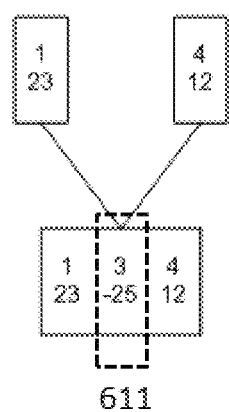

In the present embodiment, Key 2 is removed from the data store, but is memorialized (along with the operation version that deleted it) in the tree node. Using the concept that a (K, V) tuple in a tree node represents a sequence of keys, an optimization may be made to represent sequences of deleted keys. If the next operation (#25) deletes key #3, the result would be as illustrated in FIG. 6(E).

The tuple (3, −25) 611 represents keys 2 and 3, and the negated value of V indicates that these keys have been deleted. And the highest operation version applied to any key in that range of keys is Version 25.

2.1.3. Multiple Insertions in a Single Operation

Figure 6F:
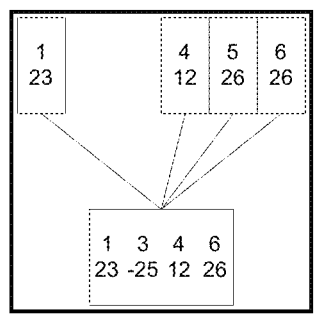

In an embodiment, (K, V) tuples that represent sequences of keys may provide a method for handling multiple data items inserted in a single operation. If the previous structure of FIG. 6(E) had new keys 5 and 6 inserted by operation #26, the result would be as illustrated in FIG. 6(F). The tuple (6, 26) now indicates that the highest operation version applied to keys 5 through 6 is version 26.

2.2. Synchronizing V Trees

In an embodiment, once the quorum formation protocol has identified $L^{BEST}$ and a set of replica machines 403 to be updated (or the quorum join protocol has identified the state of the active quorum and a new replica to join the quorum), the V tree representing the back-level (or new) replica machine 403 is updated to match that of the replica machine 403 with the best log history. In an embodiment, the best log history refers to the most recent log history.

In an embodiment, during the quorum formation protocol, there may be no active quorum, and the V tree update may occur with static trees. But if there is a new replica machine 403 joining an active quorum, the update algorithm is resilient to operations being committed in a sequence that interleaves with steps of the update. The synchronization algorithm is based on the disclosure in section 2.1.1 Basic V Tree Structure. If a sequence of keys in two V trees report the same maximum operation version, then the data associated with those keys is the same. The basic algorithm recursively analyzes the key sequence by breaking it down into subsequences that can either be (a) discarded as being the same, (b) updated as leaves that represent specific keys, or (c) further broken down and recursively analyzed.

An embodiment unrolls and manages the recursion iteratively. Therefore, to update a target tree to match it to a source tree, two operational lists are kept for the target tree, which are a list of unsynchronized key ranges LUR=$\{r_1, r_2, \ldots\}$, and a list of synchronized key ranges LSR=$\{s_1, s_2, \ldots\}$. Each r and s is an ordered pair of keys, [m, n], which represents the inclusive, ordered range of keys $\{m, \ldots, n\}$. Initially the range of keys may be unsynchronized:

LUR=$\{(1, MAX\_INT)\}$

LSR=$\{\}$

In the present embodiment, the synchronization algorithm may process the ranges in LUR and move them to LSR, which terminates when LUR is empty and LSR represents all the keys. The logic of the algorithm is recursive, but the present embodiment is implemented as an iteration. In each iteration the algorithm processes the first range in LUR ($r_1$) and retrieves a breakdown of that range from the source tree. The breakdown may decompose the range into sub-ranges ($r_{1a}$, $r_{1b}$, ...), each with its own maximum operation version ($V^{LARGEST}$). The algorithm may iterate through the sub-ranges and compare each to the same sub-range in the target tree and, If $V^{LARGEST}$ is the same in the target tree and the source tree, then the range is moved from LUR to LSR;

If $V^{LARGEST}$ is not the same in the target tree and the source tree, but the sub-ranges are from a leaf node of the source tree, then the version information for these keys is copied from the source tree to the target tree, and the sub-range is merged into LSR;

If $V^{LARGEST}$ is not the same in the target tree and the source tree, but the sub-ranges are not from a leaf node of the source tree, then the sub-range is added to a temporary list.

In the present embodiment, when the algorithm has finished processing the sub-ranges, it replaces $r_1$ (on LUR) with the temporary list. Thus the initial range has been decomposed into the individual sub-ranges, and these sub-ranges may be discarded, copied into the target tree, or returned to LUR for further processing. The algorithm may terminate when LUR is empty, indicating that the tree has been synchronized. For example, there may be a data replication system that maintains V trees on its data stores.

The system may have a replica machine U that is up-to-date and a replica machine O that is out-of-date, which means that operations 1 through N have been applied to the replica machine O and operations 1 through (N+K) have been applied to the replica machine U. The goal may be to update the replica machine O's V tree and associated data store so that they are substantially the same as the replica machine U's V tree and associated data store. The V tree structure of the present embodiment greatly reduces the amount of data transfer that needs to occur in the communications channel between the replica machines O and U during this update process by using some variation of the following basic protocol:

1. Initialize LUR in the replica machine O as described above.
2. The replica machine O takes the first range from LUR and sends a message to the replica machine U requesting decomposition of that range.
3. The replica machine U responds with a decomposition as described in section 2.2.1 Decomposing a Key Range.
4. The replica machine O receives that response and processes it according to the principles described earlier in this section resulting in (i) finer-grained or empty LUR and (ii) newly discovered set of keys that are known to have been inserted/updated/deleted in the replica machine U by the operations that the replica machine O has missed.

If LUR is not empty, the replica machine O returns to action 2.

In an embodiment, when the exact set of keys that have been affected by the operations and have been missed by the replica machine O is known, the replica machine O may discard the data associated with deleted keys and request the data associated with inserted/updated keys. Once responses to these requests are received and processed, the replica machine O will be in sync with the replica machine U.

2.2.1. Decomposing a Key Range

In an embodiment, each iteration of the synchronization algorithm may break down a key range into sub-ranges, based on information in the source tree. Given a key range [m, n], the present embodiment may seek the node closest to the root of the source tree where the key range is covered by the range, which may be implied by more than one (K, V) tuple; it then returns the ranges represented by these (K, V) tuples. The present embodiment may return the tuples of the child nodes of the (K, V) tuples to get a finer decomposition of the requested range. If there is a case in which (m, n) is covered by only a single (K, V) tuple throughout the entire source tree (all the way down to the leaves), that single range will be returned. And coming from a leaf, this may cause the algorithm to copy values instead of seeking further decomposition of the range.

2.2.2. Computing Exact Ranges in a V Tree

In an embodiment, the range being requested for decomposition does not exactly match a range explicitly represented in the source tree. For example, if the requested range is [500, 3500], and the (K, V) tuples in the source tree are (1000, $v_1$), (2000, $v_2$), (3000, $v_3$), (4000, $v_4$), the algorithm may need to descend the sub-tree beneath (1000, $v_1$) to get the $V^{LARGEST}$ for keys [500, 1000], and descend the sub-tree beneath (4000, $v_4$) to get the $V^{LARGEST}$ for keys [3001, 3500]. After these computations, the algorithm may break down the requested range [500, 3500] into [500, 1000], [1001, 2000], [2001, 3000], [3001, 3500] and return each with its individual $V^{LARGEST}$.

2.2.3. Synchronizing to a Live Source Tree

As noted in section 2.2, an embodiment of the synchronization protocol may run either during quorum formation when no live operations are being processed, or at a point when a new replica machine 403 is being added to an active quorum. In the latter case, the protocol may be designed to be resilient to changes in the tree by requiring that operations be passed to the new replica machine from the replica machine to which synchronization is taking place.

In an embodiment, when applying live operations to the target tree for the ancestor node entries of the key range affected by the operation, if their range intersects with LUR, their version annotations are marked as 'unresolved.' This is contrary to being updated to the new $V^{LARGEST}$ as it normally would be if the range is in LSR or if the tree is up-to-date. The tree synchronization protocol may treat comparisons between source tree sub-range version and target tree sub-range containing any 'unresolved' versions as a version mismatch subcase.

3. Simplified Efficient Replica Catch-Up

In an embodiment, an efficient method for performing a replica catch-up is provided. The present embodiment provides efficiencies, including simplified data structures and reduced computational overhead, a catch-up process that makes a single pass over a pre-computed linear list of update Operations rather than multiple refining passes over balanced trees, and simplified, faster, and more compact implementation of multiple indices and "sequences of sequences." The latter is particularly complex with tree-based structures.

As aforementioned, the basic scenario involves a distributed system in which a client application makes a request for an Operation (insert, update or delete). Each request is received by a designated leader machine, which then distributes the request to a group of replica machines. This configuration is once again illustrated in FIG. 2.

The leader machine 202 manages the operation of the replica machines 204 to ensure that the entire system is able to survive process outages, messages losses, and network breaks. In an aforementioned embodiment, a tree-based protocol was previously described for efficiently catching-up a replica machine that has rejoined the group after a process failure or disconnection while at the same time allowing for additional replicated operations. The present section provides another embodiment of the method for performing the replica machine 203 catch-up.

3.1. Terminology

The system receives an Operation, O, to be performed upon a key-value store. The Operations may be an insert, delete or update on a specific key, K. In an embodiment, the Operations are idempotent. In an embodiment, the update operation can only replace a resident value and it cannot require knowing previous value to perform it. Keys are inserted in consecutive order (i.e., 1, 2, 3, 4, etc.). Keys must be inserted before they can be updated or deleted. Once a key is deleted, it cannot be reinserted or updated. In an embodiment, each Operation has a sequential, integer version number, V. The leader machine and the replica machines each maintain an individual log of the Operations it has received.

3.2. Simplified Efficient Catch-Up of a Replica

An embodiment of the catch-up protocol is invoked when a replica machine is entering or returning to the system. At this point, the replica machine will have received and processed a sequence of n operations, $O_1, \ldots, O_n$ and the leader machine will have received and processed a more extensive sequence of n+k operations, $O_1, \ldots, O_n, O_{n+1}, \ldots, O_{n+k}$. Because the underlying replication protocol ensures that the first n Operations in the leader machine's and the replica machine's sequences are identical, catching-up requires only that the leader machine send operations $O_{n+1}$ through $O_{n+k}$ to the replica machines for processing.

Other approaches to this protocol may require the leader machine and each of the replica machines to maintain a log of every Operation they've received, but this creates several issues. First, the logs will grow unboundedly as new Operations are received, processed, and logged. Also, the catch-up portion of the log (i.e., $O_{n+1}$ through $O_{n+k}$) may contain redundant Operations that lead to inefficient update processing. For example, the sequence, "insert K, update K, update K, delete K," may be more efficiently processed with just "delete K."

The embodiments provided in this disclosure resolve the aforementioned issues. In an embodiment, each Operation log will contain at most 2 L entries, where L is a number referring to a number of active (i.e., non-deleted) Keys. An embodiment of the catch-up portion of a log will contain at most one operation for any given Key. And additional Operations received during a catch-up will be correctly and efficiently processed. An embodiment described below is both space- and time-efficient, and is fully resilient to additional Operations being processed during a catch-up.

3.2.1. Managing the Operation Log

In an embodiment, the leader machine and each replica machine maintain a log of Operations, ordered by Version (that is, the Operations are kept in the order of their original sequencing). In an embodiment, the Version is alternatively called an operation version number. Each record in the list includes the Version, Operation type (insert, delete or update), Key, and any data value associated with the Operation as illustrated in FIG. 7. In another embodiment, the record may include a plurality or range of Keys. FIG. 7 further illustrates how the log is updated as new operations are received. In an embodiment, insert operations are added to an end of the log. Update operations are similarly added to the end of the log, but with update operations, the previous entry for the key is removed. Delete operations are also added to the end of the log, but with delete operations, the previous entry for the key is removed.

Note that in this embodiment, delete Operations do not delete the key from the log. In another embodiment, the key may simply be marked as deleted, but even this is not necessary. In addition, the processing of delete Operations merges contiguous sequences of deleted keys into a single log entry. The Version of such a merged delete log entry is the maximum Version of the individual delete Operations being combined.

FIGS. 8(A)-8(J) illustrate an example of picture logs changing in accordance with a sequence of operations. An "Insert 1, 100" Operation would result in the log illustrated in FIG. 8(A). Version indicates "1," Operation indicates "Insert," Key indicates "1," and Value indicates a "100" according to the Operation. A subsequent "Insert 2, 20" Operation would result in the log illustrated in FIG. 8(B). This Operation reads Version "2," as it is the second Operation in this embodiment. It further reads Operation "Insert," Key "2," and Value "20" according to the instructed or ordered Operation. A subsequent "Insert 3, 50" Operation would result in the log illustrated in FIG. 8(C). Once again, the Operation is placed after (to the right of) the previous one. It reads Version "3," Operation "Insert," Key "3," and Value "50" as specified in the Operation. A subsequent "Update 2, 75" Operation would result in the log illustrated in FIG. 8(D). In accordance to the aforementioned principles, since this Operation is an update Operation, it is placed at the end of the log. However, the previous entry for the key is removed and replaced with the value specified in the Operation, which is "75" in this case. Thus, in this embodiment, the Value "20" gets replaced with "75" for Key "2". Version reads "4" because this is the fourth Operation. A subsequent "Insert 4, 90" Operation would result in the log illustrated in FIG. 8(E). Since it's an Insert operation, it is placed at the end of the log. The Version reads "5" because it is the fifth Operation in this embodiment. Key reads "4" and Value reads "90" as specified in the Operation. A subsequent "Delete 2" Operation would result in the log as shown in FIG. 8(F). Its Version reads "6" because it is the sixth Operation in this embodiment. Since it is a Delete Operation, it gets placed at the end of the log. However, the previous entry for the key is removed. Thus, in this embodiment, the previous entry or the Value "75" for Key "2" gets removed.

A subsequent "Insert 5, 66" Operation would result in the log shown in FIG. 8(G). Its Version reads "7" because it is the seventh Operation in this embodiment. It gets placed at the end of the log because it is an Insert Operation. Its Key and Value read "5" and "66" respectively as specified in the Operation. A subsequent "Delete 1" Operation would result in the log shown in FIG. 8(H). Its Version reads "8" because it is the eighth operation in this embodiment. It gets placed at the end of the log because it is a Delete Operation. The previous entry ("100") for the key ("1") gets removed. In an embodiment, the system merges Delete Operations. Thus, Delete records for Key "1" and Key "2" get merged as illustrated in the figure. To further illustrate the Delete Operations, a subsequent Operation "Delete 4" would result in the log shown in FIG. 8(I). Its Version reads "9" because it is the ninth Operation in this embodiment. It gets placed at the end of the log because it is a Delete Operation. The Value of the Key "4" gets removed as instructed. Similarly, a subsequent Operation "Delete 3" would result in the log as shown in FIG. 8(J). Now since all Values for Keys "1" through "4" have been deleted, the records for the Delete Operation get merged as shown in the figure.

Note that the log contains exactly one record for each live key, and that the total length of the log can never exceed 2 L. In an embodiment, the maximum length of a log is easily found by observing that there can be at most one delete record between any pair of live keys.

Figure 9:
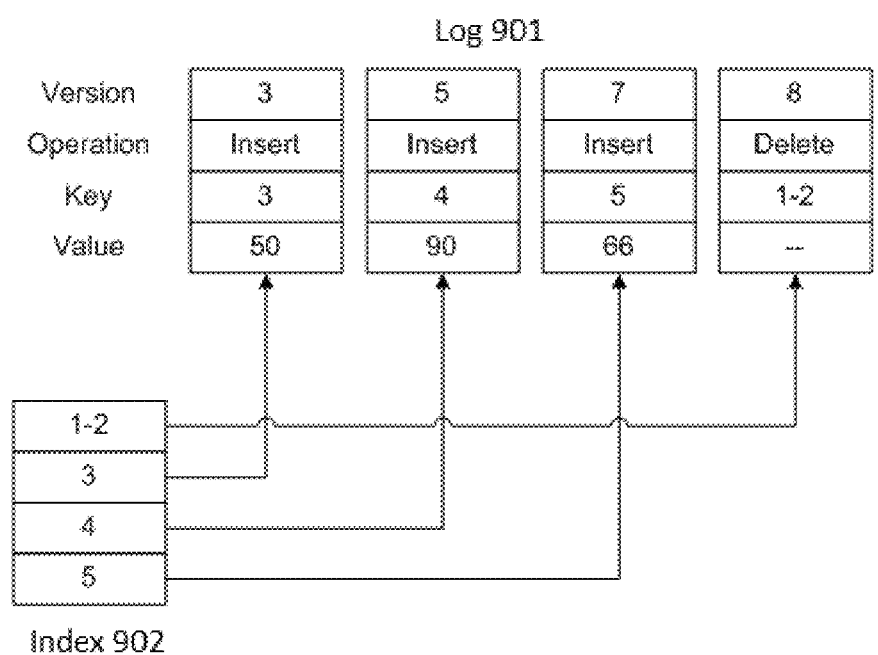
FIG. 9 is a diagram illustrating the relationship between a replica machine's log and associated index for keys.

One detail yet to be explained is how the system efficiently merges delete records. In an embodiment, for each delete Operation, the system checks whether there is a contiguous delete record below or above the Key being deleted. E.g., when Key 3 is deleted, the system must check whether there is a delete record that includes 2 or 4. FIG. 9 illustrates an embodiment of a system after Operation "Delete 1" above. The system keeps a secondary index 902 sorted by Key, with entries that point to the related log record in a log 901. The secondary index 902 is updated each time an Operation is processed, and, as with the log entries, delete records are combined. Thus, after Operation "Delete 1" above, the log and the index would look like FIG. 9. With the addition of the Key index 902, the system can now efficiently find whether there are contiguous deleted keys below or above a new deletion.

3.2.2. Executing a Replica Catch-Up

As mentioned before, a catch-up protocol is triggered when a replica machine enters or returns to the system. Conceptually, the catch-up protocol has the leader machine replay missed Operations to the replica machine. In reality, given the management of the log described in the previous section, the catch-up protocol has the leader replay only still-relevant Operations.

For example, if the replica machine joins the group after Operation "Delete 2" above, Operations "Insert 2, 20" and "Update 2, 75" would have already been removed from the leader machine's log, and thus not replayed for the replica machine.

Figure 10:
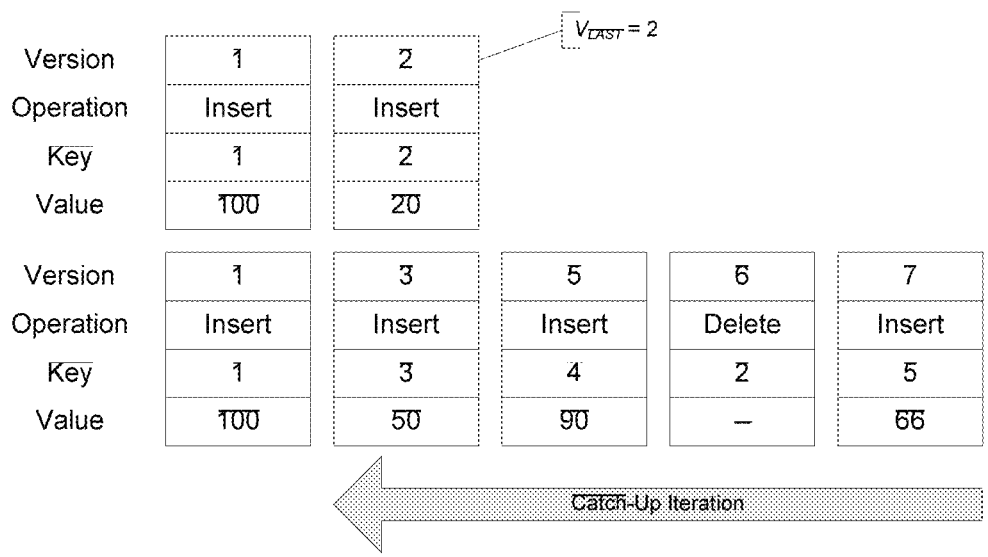
FIG. 10 is a diagram illustrating a replica machine catch-up protocol.

In an embodiment, the basics of the catch-up protocol comprise (1) identifying the Version of the last Operation in the replica machine's log as $V_{LAST}$; and (2) iterating backwards from the last operation in the Leader's log, and sending each Operation to the replica machine for processing and stopping when the replica machine reports having reached an Operation whose version is less or equal to $V_{LAST}$. In regards to iterating backwards, in an embodiment, the algorithm iterates backwards to simplify the detection of the iteration's endpoint without needing a separate index on the Log. This embodiment of the catch-up protocol is illustrated in FIG. 10. In this embodiment, the catch-up protocol iterates through Versions 7, 6, 5 and 3, sending the associated operation to the Replica, and stopping when the Replica reports that Operation 1 is $\leq V_{LAST}$.

(a) Handling Additional Operations During a Catch-Up

As noted earlier, the catch-up protocol is resilient to new Operations being processed as the catch-up proceeds. To accomplish this, the leader machine continues to process new Operations as they arrive, and discards any Catch-Up operation that affects the same Key.

Thus, in the example above, should an update Operation for Key 4 arrive in between the processing of Operation Versions #7 and #6, the new Operation would be processed immediately, and Operation Version #5 (which also affects Key 4) would be discarded.

Because all Operations, both catch-up and new, funnel through the leader machine, the order in which they are given to the replica machines can be controlled. In an embodiment, the leader machine ensures that a new Operation is never followed by a stale catch-up Operation.

One must be careful in processing new delete operations, as the leader machine may have information that allows it to merge records for deleted keys, and that information may not have yet been passed-to and processed-by the replica machines. For example, consider a sequence of operations that have been processed by the leader machine but not the replica machine.

15. Insert 5
16. Delete 5
17. Insert 6
18. Insert 7
19. Delete 7

Figure 11B:
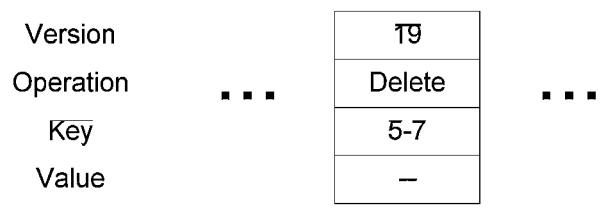

These operations will be in the portion of the leader machine's log that is replayed to the replica machines during catch-up, as shown in FIG. 11(A). Should the new operation "Delete 6" be received by the leader machine, it will merge the records for keys 5, 6 and 7 into a single entry as shown in FIG. 11(B).

This could cause the replica machine's catch-up to produce an incorrect result. In particular, if the catch-up process has not yet sent the delete Operation for Keys 5 and 7, and they are removed from the catch-up log as they're merged, the replica machine will fail to delete them.

The solution is for the leader machine to carefully process delete Operations. In cases that delete records are being merged, and the individual records have yet to be processed by the catch-up process, the leader machine sends the to be merged records ahead of the actual delete operation (rather than just the new delete Operation), so that the replica machine will correctly mirror the deletions and merging of the leader machine.

3.3. Relaxing the Requirement of Consecutive Key Order

As described earlier, Keys are expected to be inserted in consecutive order (e.g., 1, 2, 3, 4, etc.). This section details an enhancement that allows the insertion sequence to contain gaps (that is, Keys that are not, and will never be, inserted). Keys that are skipped, if not handled correctly, can cause the log to grow unboundedly, as the gaps will not be merged.

In an embodiment, a premise of handling skipped Keys is that every machine (leader and replica machines) must process delete Operations for the missing Keys. This allows the system's state to record the Keys' absence, and to merge their delete records as contiguous Keys are explicitly deleted or implicitly skipped.

The simplest way to handle gaps is to have the leader machine create, process, and send to the replica machines explicit delete Operations for any Keys that are found to be skipped. Note that the creation of delete Operations for missing keys induces a delete before an insert. While this does not create a correctness issue for the system, in an embodiment, one could generate an insert/delete pair of Operations to stay within the technical bounds of "insert before delete." The Leader can easily recognize an insert Operation that leaves a gap and generate the appropriate delete Operations.

An embodiment of this method may be optimized in two ways.

1. If there is no catch-up in progress, a replica machine can deduce missing Keys by comparing the Key of an insert Operation to the highest Key previously seen. The replica machine can then self-generate and process the appropriate delete Operations, rather than requiring the leader machine to generate and send such Operations.
2. If a catch-up is in progress, the leader machine only needs to send explicit delete Operations if a new insert Operation (that is, a live Operation that is received and propagated to the replica machine during the catch-up protocol) creates a gap. In this case, the leader machine sends delete Operations for the missing keys induced by the first new insert.

Note that in case (2), any additional gaps that are induced by additional new insert Operations can be deduced by the replica machine without explicit instruction from the leader machine.

3.4. Relaxing the Requirements on Operation Order

In an embodiment described earlier, insert Operations had to precede delete and update Operations. In another embodiment, delete Operations precede insert Operations.

In the case that a delete Operation is received before an insert (or update) Operation for the same Key, the insert (or update) Operation can be ignored. That is, the insert (or update) Operation can be discarded by the leader machine without processing and without forwarding it to the replica machines.

The only case of special-processing that is required is when the insert Operation would create a gap in Keys as described earlier. In this case, the leader machine generates, processes, and sends to the replica machines explicit delete Operations for the missing Keys. Note that the insert Operation itself is still ignored. Note that intermediate states may temporarily consume more than 2 L memory, though the eventual resolution of Keys deleted before insertion (either by an insert for the deleted key, or by inferring that a key will never be inserted, based on the insertion/deletion of consecutive keys on either side) will return memory use below the 2 L threshold.

3.5. Use of Multiple Key Indices to Represent Multiple Key Sequences

The examples and embodiments described thus far include only a single sequence of Keys.

In an embodiment involving multiple Key sequences (e.g., sequences defined by separate publisher clients) co-exist within a log system, an Operation Log can contain records for multiple independent Key sequences. The only enhancement required in this case is to maintain a separate Key index for each of the Key sequences that are in use.

As an additional enhancement in an embodiment, Key sequences themselves may be assigned consecutive IDs, and those meta-sequences maintained as just another Key sequence. That would allow an Operation Log to efficiently record when an entire Key sequence is deleted.

3.6. Relaxing the One-to-One Relationship Between the Key Index and the Operation Log In FIG. 9, the key-sorted index 902 is shown to have a one-to-one relationship between its entries and entries in the Operation Log 901. This section details enhancements that allow an Operation Log entry to be referenced by more than one Key index.

This is useful in a publish/subscribe system in which a published message may be delivered to multiple subscribers. By constructing a Key index per subscriber, a single Operation Log entry can be used to represent the sent message, and a reference count can be used to ensure that an entry is not removed from the Log until all subscribers have consumed the message. As each subscriber consumes the message a delete Operation is issued, the relevant entry is deleted from the subscriber's Key index, and if this is the last Key index reference to the Log entry, the entry is deleted as described in Section 3.2.1 Managing the Operation Log.

3.7 Allowing Arbitrary Key Insertion Order

In an embodiment, if it is unimportant to distinguish between a key that had never been inserted and a key that had been inserted and deleted, then keys may be inserted in an arbitrary order. Initialize the system by replicating delete operation for entire key range. Then, whenever a key needs to be inserted into matching deleted range, the remaining portions of the range may be split off into separated deleted ranges. If this split happens in an unsynced portion of the log, the leader machine may have to explicitly forward the split-off deleted ranges to the replica machines that require catching up. The deleted keys may be re-inserted. In an embodiment, the keys can be of any sortable type.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents.

For example, as referred to herein, a user interface may be a virtual machine, computer, or host. Also as referred to herein, a network may refer to communication channels that facilitate communications between user interfaces and the predictive system. A network may also refer to a communication medium between processes on the same machine. Also as referred to herein, a server is a machine deployed to execute a program operating as a socket listener and may include software instances. Examples of a processor include digital signal processors (DSPs), application-specific integrated circuits (ASICs), field-programmable gate arrays (FPGAs), and any other suitable specific or general purpose processors.

Memory may store any suitable information. Memory may comprise any collection and arrangement of volatile and/or non-volatile components suitable for storing data. For example, memory may comprise random access memory (RAM) devices, read-only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by a processor.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and time such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of updating replica machines that are connected to a leader machine, the method comprising:

maintaining, by each of the replica machines, an operation log, each log entry in each operation log including an operation log number, a key, and an operation performed on the key, the operation log sorted by operation log number;

assigning, by the leader machine, a monotonically increasing operation log number to an operation command;

receiving by the replica machines the operation command and operation log number assigned to the operation command from the leader machine to operate on the operation logs of the replica machines;

operating by the replica machines on the operation command;

inserting, into the operation log of each of the replica machines, a new log entry, the new log entry including the operation log number assigned to the operation command, a key specified in the operation command, and an operation to perform on the key specified in the operation command;

updating a secondary index of each of the replica machines, the secondary index sorted by keys; and updating an operation log of a first replica machine based on an operation log of the leader machine by:
    iteratively inserting, into the operation log of the first replica machine, those log entries in the tail end of the operation log of the leader machine that are missing in the operation log of the first replica machine; and
    for each log entry being iteratively inserted into the operation log of the first replica machine, performing by the first replica machine an operation included in the said log entry being iteratively inserted into the operation log of the first replica machine.

2. The method of claim 1, wherein each of the operation commands comprises an operation type, key, and a value, further wherein the operation type is an insert, delete, or update.

3. The method of claim 2, wherein a positive number is assigned as the operation log number of an initial operation command.

4. The method of claim 3, wherein the operation log number is monotonically increased for each subsequent operation command.

5. The method of claim 4, wherein the operation commands with the operation type insert are recorded at an end of the operation log, with the operation type update are recorded at the end of the operation log, and with the operation type delete are recorded at the end of the log.

6. The method of claim 5, wherein the operation command with the operation type update can only replace the value of the record with the same key.

7. The method of claim 6, wherein the operation commands with the operation type update or delete can only be recorded in the operation log after the operation command with the same key with the operation type insert has been recorded in and subsequently removed from the log.

8. The method of claim 7, wherein the records of the operation commands with the operation type delete get merged to a single record at the end of the operation log if the records are sequentially recorded.

9. The method of claim 8, wherein the records of the operation commands with the operation type delete get merged by referring to the secondary index, wherein the secondary index is updated by merging delete records.

10. The method of claim 1, wherein the operation log allows multiple secondary indexes sorted by key.

11. The method of claim 10, wherein secondary indexes may themselves be assigned ids and would be managed by another secondary index that tracks those ids.

12. The method of claim 11, wherein each record in the secondary index sorted by the keys does not have a one-to-one connection with records in the operation logs.

13. The method of claim 12, wherein each key inserted may not be consecutive if unused, lower keys are deleted as well.

14. The method of claim 13, wherein delete operations for a given key may precede the insert operation for that same key.

15. The method of claim 1, wherein, keys may be inserted in an arbitrary order when distinguishing between a key that had never been inserted and a key that had been inserted and deleted is not required.

16. The method of claim 15, wherein, keys may be of any sortable type.

17. The method of claim 1, further comprising simultaneously receiving by the leader machine new operation commands from a client application.

18. A method of updating a plurality of replica machines connected to a leader machine, wherein each replica machine comprises its own tree structure having four levels, further wherein a first level comprises a root node, a second level comprises interior nodes stemming from the root node, wherein the interior nodes are themselves organized into a tree, a third level comprises leaf nodes stemming from the interior nodes, and a fourth level comprises data stores stemming from the leaf nodes, the method comprising:

sending by the leader machine operation commands to the replica machines, wherein each operation command comprises an operation, a key, a monotonically increasing operation log number assigned to the operation command by the leader machine, and data;

receiving, by each of the replica machines, the operation command; and updating, by each of the replica machines, its own tree structure according to the received operation command;

updating a tree structure of a first replica machine based on a tree structure of the leader machine by:
    decomposing, into sub-ranges, a range of key values stored in the tree structure of the first replica machine, each sub-range having its own maximum operation log number; and
    for each sub-range, recursively comparing and updating a maximum operation log number in the sub-range with a maximum operation log number in a corresponding sub-range of key values stored in the tree structure of the leader machine;

wherein each replica machine constructs and maintains its own tree structure.

19. The method of claim 18, wherein the root node has at most a positive set number of nodes stemming from the root node, further wherein each of the interior nodes has a number of nodes stemming from the interior node between the positive number and half of the positive number, and further wherein each of the leaf nodes comprises a number of key values between the set positive number and half of the positive number.

20. The method of claim 19, wherein the set positive number may be an operating parameter that is configured by an administrator.

21. The method of claim 20, wherein the set positive number may be different for trees for each of the replica machines.

22. The method of claim 19, wherein each leaf node comprises pairs, wherein each node pair comprises a key and an operation version number, and further wherein each non-leaf node comprises pairs, wherein each non-leaf node pair comprises a largest key and a largest operation version number from nodes that stem from the non-leaf node.

23. The method of claim 22, wherein each leaf node pair represents a sequence of consecutive keys that ranges from a key that is immediately left of the node pair that the leaf node pair stems from through to the key.

24. The method of claim 18, wherein the operation is a delete, insert, or update.

25. The method of claim 24, wherein, if the operation specified in the operation command is the delete operation, the operation log number for the key specified in the operation command is negated.

26. The method of claim 25, wherein consecutive records of the operation commands with the operation type delete are merged.

27. The method of claim 18, wherein updating of the tree structure further comprises updating by the replica machines a list of unsynchronized key ranges and a list of synchronized key ranges.

28. The method of claim 27, wherein each key of the list of unsynchronized key ranges and each key of the list of synchronized key ranges form an ordered pair of keys.

29. The method of claim 28 further comprising decomposing the unsynchronized key ranges into sub-ranges, wherein each of the sub-ranges comprises a sub-key with its own maximum operation log number.

30. The method of claim 29 further comprising recursively updating the sub-ranges of a tree structure to provide updating with each of a same sub-range in the tree structure to be updated, wherein, if the largest operation log number is the same in a tree structure to provide the updating and the tree structure to be updated, then the range is moved from the list of unsynchronized key ranges to the list of synchronized key ranges, further wherein, if the largest operation log number is not the same in the tree structure to provide the updating and the tree structure to be updated, and the sub-ranges are from a leaf node of the tree structure of the leader machine, then the operation log number and the data for the key is copied from the tree structure to provide the updating to the tree to be updated, and the sub-range is merged into the list of synchronized key ranges, and further wherein, if the largest operation log number is not the same in the tree structure to provide the updating and the tree structure to be updated, and the sub-ranges are not from a leaf node of the tree structure to provide the updating, then the sub-range is added to a temporary list, which is then substituted into the list of unsynchronized key ranges for the sub-range that was decomposed to produce this temporary list.

31. The method of claim 18, further comprising simultaneously receiving by the leader machine new operation commands from a client application.

* * * * *